J. H. WAGENHORST.
VEHICLE WHEEL RIM.
APPLICATION FILED MAR. 14, 1911.
1,136,982.
Patented Apr. 27, 1915.
2 SHEETS—SHEET 1.
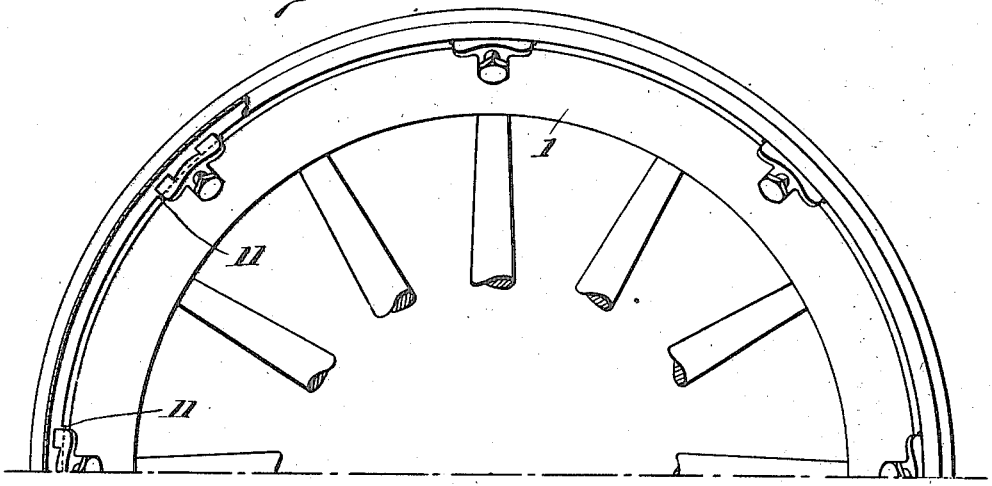
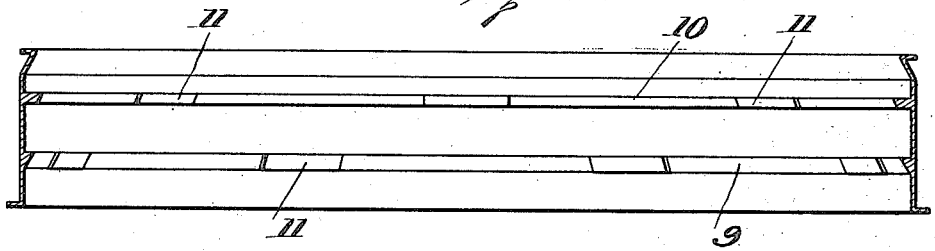
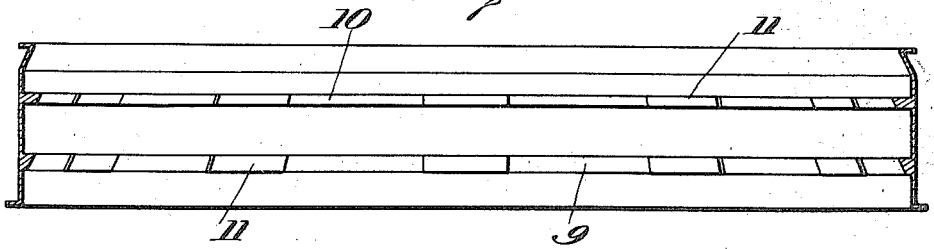
Witnesses:
Charles D Donahue
Gerald E. Terwilliger
James H. Wagenhorst Inventor
By his Attorney
Seward Davis

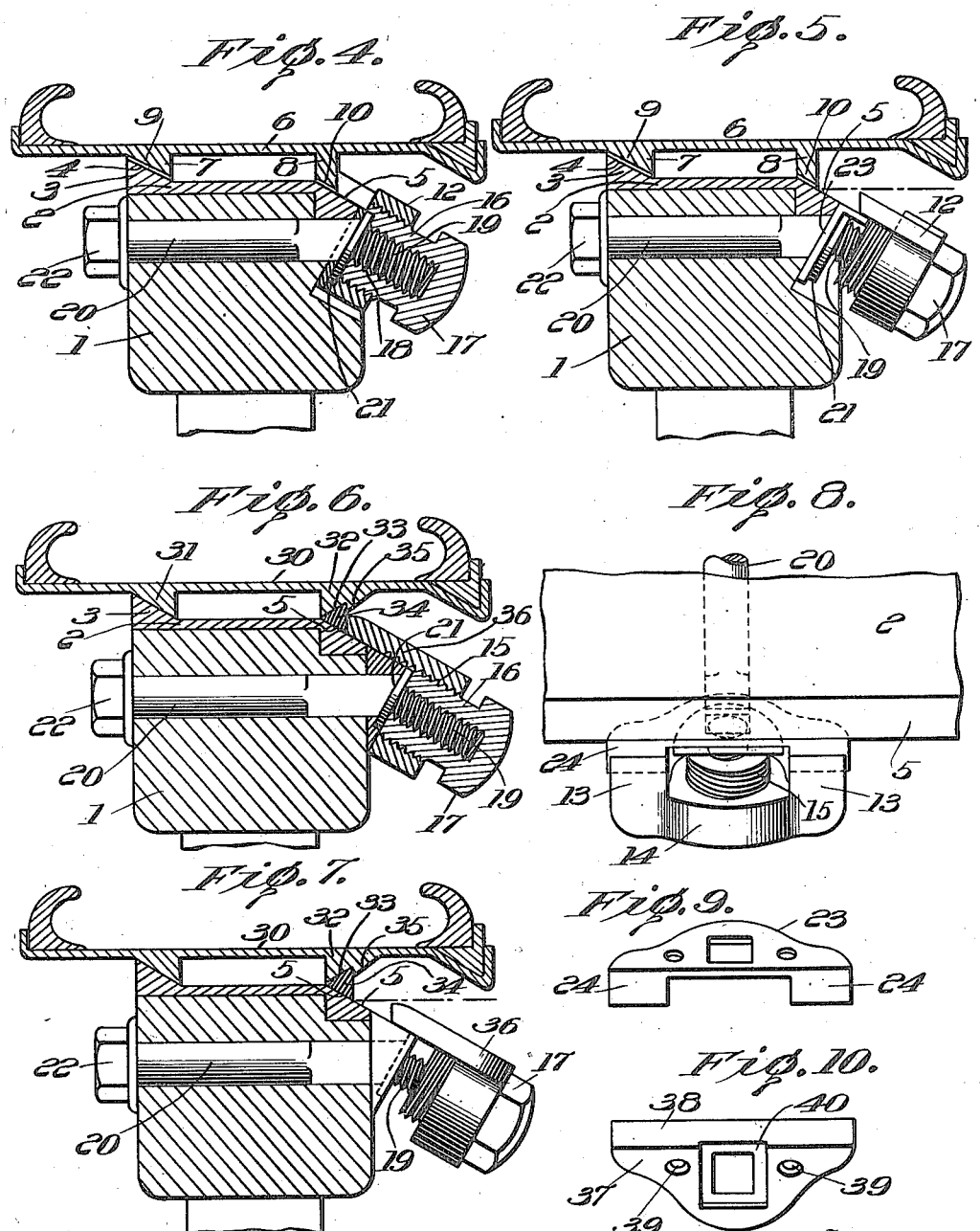

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE WHEEL-RIM.

1,136,982.      Specification of Letters Patent.      Patented Apr. 27, 1915.

Application filed March 14, 1911. Serial No. 614,358.

*To all whom it may concern:*

Be it known that I, JAMES H. WAGENHORST, a citizen of the United States, residing in the city of Akron, county of Summit, and State of Ohio, have invented certain new and useful Improvements in Vehicle Wheel-Rims, of which the following is a specification.

This invention relates to that class of vehicle wheel rims in which a tire-carrying rim capable of carrying an inflated tire is detachably secured to a vehicle wheel. Rims of this class are commonly called "demountable" rims.

The present invention relates to improved means for securing a detachable tire-carrying rim upon a wheel.

It also contemplates certain improvements in the structure of the tire-carrying rim serving to insure the proper seating of the same upon the wheel.

In the accompanying drawings, which form a part of this specification, Figure 1 is a side elevation of a portion of a vehicle wheel and tire-carrying rim mounted thereon embodying one form of my invention; Fig. 2 is a plan view of the bottom or inner surface of a tire-carrying rim illustrating one form of my improved structure thereof; Fig. 3 is a similar view of a slightly modified form of rim; Fig. 4 is a transverse section of a felly, felly band and tire-carrying rim illustrating my improved locking device, the locking-member being shown in operative position; Fig. 5 is a view similar to Fig. 4, the locking-member being shown wholly in elevation and moved to inoperative position; Fig. 6 is a view similar to Fig. 4 showing a modification of my locking-means as applied to a slightly different form of tire-carrying rim; Fig. 7 is a view similar to Fig. 6, the locking-device being shown in elevation and as withdrawn to inoperative position; Fig. 8 is a plan view of a portion of a felly band and of the locking-device shown in Figs. 4 and 5, the locking-device being in the position shown in Fig. 5; Fig. 9 is a plan view of the guide-plate used in connection with the locking-device shown in Figs. 4, 5 and 8; Fig. 10 is an elevation of the guide-member or block used in connection with the form of locking-device shown in Figs. 6 and 7.

In this specification and in the drawings accompanying the same I have shown certain specific embodiments of my invention which I have chosen for purposes of illustration. I do not desire to limit myself, however, to these specific constructions, as my invention is capable of many other embodiments.

Referring to the drawings in detail, the numeral 1 designates a wheel felly, to which is permanently secured, by shrinking or otherwise, the felly band 2. This felly band is preferably provided at one edge with an outwardly projecting flange 3 provided with a rim-engaging face 4, and at the other edge with an inwardly or downwardly inclined face 5.

In Figs. 1, 2, 4 and 5 I have shown a detachable tire-carrying rim 6 provided with a pair of flanges 7 and 8 having similarly inclined wedging surfaces 9 and 10 adapted to engage, respectively, with the wedging surfaces 4 and 5 on the felly band. In order to promote a uniform engagement between these wedging surfaces, to permit of the use of different tire-carrying rims interchangeably upon the same wheel and to make it possible to force tire-carrying rims of slightly different dimensions to the same lateral position upon the wheel, I provide the wedging faces of the flanges 7 and 8 with circumferentially spaced projections or lands 11. By the use of these lands the rim may actually be supported only at intervals, although usually the bearing surfaces of the rim and felly band will engage throughout a greater or less portion of the space between adjacent lands. In case the rim is slightly under-size, it will straighten out between adjacent lands, thus, in effect, enlarging its diameter and permitting it to be forced laterally upon the wheel to the desired extent.

As it is impracticable in the manufacture of rims upon a commercial scale to insure absolute uniformity of dimensions unless lands such as described or some equivalent therefor are provided, it is impossible to insure the seating of different rims in the same lateral position upon the wheel. Any suitable number of lands 11 may be used, they being preferably spaced at uniform intervals about the rim. The lands upon the surfaces 9 and 10 may be arranged in staggered relation, as shown in Fig. 2, or may be placed opposite to each other, as shown in Fig. 3, or may be otherwise suitably located. It is not necessary to have the same number of lands upon the two faces, though this is preferable. The lands or projections may be of any suitable height, preferably about one-thirty-second of an inch, though I do not desire to limit myself in any way to this dimension. The lands may be formed integral with the flanges or firmly secured thereto in any suitable manner. I do not claim the use of lands broadly in this application, as the same forms the subject-matter of my application Serial Number 614,356 filed of even date herewith. In this application I claim merely the specific modification of the invention claimed in the above-named application, in which the lands are formed upon the inner or under surface of the tire-carrying rim.

In Figs. 1, 4, 5, 8 and 9 I have shown an improved locking-means for securing the tire-carrying rim upon the wheel. These means comprise a plurality of locking-members 12 adapted to be moved into engagement with the flange 8 of the tire-carrying rim, wedging the latter upon the wheel and securing it in position thereon. These locking-members 12 comprise wings 13 adapted to engage the rim, and body or sleeve portions 14 internally threaded and secured upon the threaded portions 15 of the nuts 16. The nuts are provided with heads 17 and are internally threaded, as indicated at 18. These nuts screw on threaded inwardly inclined extensions 19 formed on the bolts 20, which pass through holes in the felly. The bolts are provided between the shanks thereof and the threaded extensions 19 with collars 21. Nuts 22 are used to prevent the withdrawal of the bolts. The collars 21 have the function of bolt-heads and are clamped against the face of the felly or against the washers or guide-plates 23, the purpose of which will be explained. The threads on the bolt extensions 19 and on the outside of the nuts 16 are of opposite pitch, so that the rotation of the nuts 16 will cause them to move in one direction or the other upon the bolt extensions. The sleeves 14, if held from rotation while the nuts are turned, will at the same time move along the nuts in the same direction in which the nuts themselves are moving, so that these sleeves will move at twice the speed at which the nuts move. These sleeves are prevented from rotation when the nuts are turned by reason of the engagement of the wings 13 with the inclined wedging-face 5. When the members 12 are withdrawn, as shown in Fig. 5, the tire-carrying rim will pass freely thereover and may be removed, but when the members are moved into the position shown in Fig. 4, the rim will be positively locked in position in an obvious manner. In order to guide the wings 13 when the locking-members are fully withdrawn, as shown in Fig. 5, I provide the guide-plates or washers 23, which are provided with the flanges 14, preferably bent from their upper edges.

In the normal operation of the rim, the sleeves 14 engage the heads 17 of the nuts 16 before the wings 13 leave the flanges 24, as shown in Fig. 5, thereby limiting the outward movement of the locking-members. The inward movement of the locking-members is limited by the engagement of the inner faces of the nuts 16 with the flanges 21, as shown in Fig. 4. The limits of movement of the locking-members may be adjusted by regulating the initial positions of of the locking-members upon the nuts. This may be accomplished by removing the nuts 22 and withdrawing the bolts 20 sufficiently to permit the wings 13 to disengage the flanges 24, when the locking-members may be rotated about the nuts 16 and screwed one or more turns in either direction thereon.

In Figs. 6, 7 and 10 I have shown a modified form of my improved locking means, as adapted to a slightly modified form of the tire-carrying rim. The tire-carrying rim 30, shown in these figures, is provided at one side with a supporting flange 31 engaging an outwardly inclined flange on the felly band, while at the other side the tire-carrying rim is provided with a flange 32 having an oppositely inclined face 33 adapted to be engaged by a wedging ring 34. A supplemental flange 35 is preferably provided to engage the outer face of the wedging ring and to prevent the accidental displacement of the same when the tire-carrying rim is removed from the wheel. The inner face of the wedging ring 34 engages the inclined face 5 of the felly band. For forcing the wedging ring between the inclined faces 33 and 5, I utilize the locking-devices 36, similar to the locking-device 12 previously described. These devices 36 screw upon the nuts 16, which in turn screw upon the extensions 19 of bolts 20, as already fully set forth. In order to guide the locking-devices 36 and prevent their rotation when withdrawn sufficiently to permit the free removal of the tire-carrying rim and wedging ring, as indicated in Fig. 7, I provide the blocks 37 secured to the face of the felly by means of the flanges 21 of the bolts 20. The upper faces 38 of these blocks are inclined and form, practically, extensions of the inclined face 5. The blocks are preferably additionally secured to the face of the felly by means of screws adapted to pass through the screw-holes 39, these screws serving to prevent turning of the blocks upon the face of the felly. The blocks are preferably provided with recesses 40 of angular outline, adapted to receive the collars 21, which are similarly shaped. The bolts 20 are thus firmly held against rotation. The initial positions of the locking-members 36 may be adjusted by withdrawing the bolts 20 in the manner already fully described.

Having thus described my invention, I claim:

1. The combination of a vehicle wheel provided with an inclined wedging surface with a detachable tire-carrying rim adapted to be wedged upon said surface, and locking means for retaining said rim upon said wheel, comprising a locking member, movable in a direction inclined toward the center of the wheel and engaging a portion of said rim when moved to locking position, said locking member lying out of the path of said rim when moved downwardly in an inclined direction to the limit of its travel, a portion of said locking member sliding upon and being guided by an inclined surface of said wheel periphery during the portion of its travel adjacent to the felly of the wheel, and a member independent of said rim secured to the side of the wheel and having a guiding surface inclined in the direction of and forming a continuation of the adjacent portion of the wheel surface, and acting to guide said locking member during the portion of its travel remote from the felly of the wheel.

2. The combination of a vehicle wheel with a detachable tire-carrying rim adapted to be mounted thereon, and means for retaining said rim upon said wheel including a locking member movable in a line inclined toward the center of the wheel, said locking member engaging a portion of the rim when moved to locking position and lying out of the path of said rim when moved downwardly in an inclined direction, to the limit of its travel, and means for guiding said locking member in such inclined direction comprising a plate secured to the side of the wheel near the periphery thereof, said plate having a guiding surface projecting from the side of said wheel engaged by said locking member and inclined in the direction of movement of said locking member.

3. The combination of a vehicle wheel having similarly inclined wedging surfaces at the opposite edges of the periphery thereof with a detachable tire-carrying rim adapted to be mounted on said wheel and having bearing surfaces adapted to engage the wedging surfaces on the wheel, one of said bearing surfaces being formed upon a flange projecting inwardly from the rim, and means for securing said rim to said wheel, said means including a screw-threaded member projecting laterally from the wheel, but inclined toward the axis of the wheel, an internally and externally threaded nut screwing on said threaded member, and a locking-member screwing on said nut, and being supported upon and guided by the wedge surface of the wheel with which the wedging surface on the inwardly projecting flange on the rim engages, said locking-member engaging the inwardly projecting flange on the rim when moved to operative position and lying out of the path of said flange when moved to inoperative position.

4. The combination of a vehicle wheel having similarly inclined wedging surfaces at the opposite edges of the periphery thereof with a detachable tire-carrying rim adapted to be mounted on said wheel and having bearing surfaces adapted to engage the wedging surfaces on the wheel, one of said bearing surfaces being formed upon a flange projecting inwardly from the rim, means for securing said rim to said wheel, said means including a locking-member movable in a plane inclined in the direction of the inclination of the wedging surface of said wheel engaged by the bearing surface on said inwardly projecting flange, said locking-member being guided through a part of its travel by said inclined wedging surface, and a guide having a similarly inclined surface acting to guide said locking-member during the remainder of its travel.

5. The combination of a vehicle wheel having similarly inclined wedging surfaces at the opposite edges of the periphery thereof with a detachable tire-carrying rim adapted to be mounted on said wheel and having bearing surfaces adapted to engage the wedging surfaces on the wheel, one of said bearing surfaces being formed upon a flange projecting inwardly from the rim, means for securing said rim to said wheel, said means including a bolt passing through the felly of said wheel and having a collar thereon adjacent to one side of the felly, a screw-threaded portion projecting from the end of said bolt beyond said collar and inclined toward the axis of the wheel, a nut screwing on said threaded projection, a locking-member rotatably mounted upon said nut and adapted to engage the inwardly projecting flange on the rim when moved to operative position, said locking-member being guided by the inclined wedging surface on the wheel engaged by the bearing surface on the inwardly projecting flange on the rim during a part of its travel, and a plate secured between the side of the felly and the collar on said bolt, said plate having a flange projecting therefrom and inclined in the same direction as and forming an extension of said inclined wedging surface on the wheel, said flange serving to guide said locking-member during the remainder of its travel.

6. The combination of a vehicle wheel having similarly inclined wedging surfaces at the opposite edges of the periphery thereof with a detachable tire-carrying rim adapted to be mounted on said wheel and having bearing surfaces adapted to engage the wedging surfaces on the wheel, one of said bearing surfaces being formed upon a flange projecting inwardly from the rim, means for securing said rim to said wheel, said means comprising a bolt passing through the felly of said wheel and having a collar adjacent to one side of the felly and a screw-threaded portion projecting beyond said collar and inclined toward the axis of the wheel, an externally threaded nut screwed on said screw-threaded portion and having a head of greater diameter than the externally threaded portion of the nut, a locking member having a body portion screwing on said nut, and laterally extending wings engaging the inwardly projecting flange on the rim when moved to operative position, said wings sliding upon and being guided by the inclined wedging surface of the wheel during a part of the travel of the locking-member, a plate secured between the side of the felly and the collar on said bolt, said plate having outwardly projecting flanges inclined in the same direction as and forming continuations of the inclined wedging surface of the wheel, said flanges serving to guide said wings during the remainder of the travel of the locking-member and to prevent the rotation thereof.

7. The combination of a vehicle wheel having similarly inclined wedging surfaces near the edges of the periphery thereof with a detachable tire-carrying rim, supporting means for said rim bearing on said inclined surfaces, and means for locking said rim upon said wheel with said supporting means in engagement with said wedging surfaces, said means including a screw-threaded member projecting laterally from said wheel and inclined toward the axis of the wheel, a nut screwing on said member, and a locking-device rotatably mounted on said nut, said locking-device sliding on the inclined wedging surface at one side of said wheel, and being held from rotation thereby during a part of its travel, and a member secured to the side of said wheel and having a guiding surface inclined in the direction of and forming a continuation of the wedging surface on the wheel, said guiding surface being engaged by and preventing the rotation of said locking-member during the remainder of the travel of the latter.

8. The combination of a vehicle wheel with a detachable tire-carrying rim adapted to be mounted thereon, and means for retaining said rim upon said wheel including a bolt projecting from the side of the felly of said wheel, the projecting portion of said bolt being inclined toward the center of said wheel, a plate having a portion secured to the side of the felly of said wheel and having a flange extending out from the side of said felly and inclined in a direction substantially parallel to the inclined portion of said bolt, and a locking member mounted upon said inclined portion of said bolt and movable in the direction of the axis of said inclined portion toward and from the side of the wheel felly, a portion of said locking member sliding upon and being guided by the surface of the flange portion of said plate.

9. In a vehicle wheel, in combination, a fixed member, a tire-carrying rim, coacting wedging faces on said rim and fixed member, the wedging face of said rim carrying circumferentially spaced lands engaged by the corresponding face of the fixed member, the wedging face on said rim being adapted also to engage the wedging face on the fixed member between adjacent lands.

10. In a vehicle wheel, in combination, a fixed member having similarly inclined wedging surfaces at each edge thereof, a tire-carrying rim having complementary inclined surfaces provided with circumferentially spaced lands, the complementary surfaces of said fixed member and rim adapted to engage between adjacent lands, and means for securing said tire-carrying rim to said fixed member.

11. In a vehicle wheel, in combination, a fixed member provided with a plurality of laterally separated beveled surfaces forming frustums of different cones, a detachable tire-carrying rim having coacting contacting surfaces adapted to contact with respective surfaces on said member, the surfaces on said rim being provided with circumferentially spaced lands, and means for securing said detachable rim to said member.

12. A wheel comprising fixed and removable rings, the latter of which constitutes a removable rim embodying at its outer side a pair of flanges for holding a rubber tire between them, said rings having laterally separated pairs of complementary mutually engaging bearing surfaces disposed at different distances from the axis of the wheel, the bearing surfaces on the removable rim being provided with circumferentially spaced lands, said complementary bearing surfaces of the rings and the surfaces of said lands forming the only stop faces limiting the movement of the removable ring laterally upon the fixed ring.

13. The combination of a vehicle wheel having similarly inclined wedging faces at the opposite edges of the periphery thereof with a detachable tire-carrying rim adapted to be mounted on said wheel and having bearing surfaces adapted to engage the wedging surfaces on the wheel, one of said bearing surfaces being formed upon a flange projecting inwardly from the rim, means for securing said rim to said wheel, said means including a locking member movable in a plane inclined in the direction of the inclination of the wedging surface of said wheel engaged by the bearing surface on said inwardly projecting flange, said locking member comprising a bolt member secured to the wheel and a winged nut, said nut being positioned in a plane oblique to the axis of the wheel and adapted to be rapidly withdrawn to a position to permit said rim to be removed from said wheel.

JAMES H. WAGENHORST.

Witnesses:
EDMUND QUINCY MOSES,
EUGENE C. BARD.